(12) United States Patent
Kishore et al.

(10) Patent No.: US 9,015,829 B2
(45) Date of Patent: Apr. 21, 2015

(54) PREVENTING AND RESPONDING TO DISABLING OF MALWARE PROTECTION SOFTWARE

(75) Inventors: Nandi Dharma Kishore, Karnataka (IN); Anil Bhadrarajapura Ramabhatta, Karnataka (IN); Harinath Vishwanath Ramchetty, Karnataka (IN)

(73) Assignee: McAfee, Inc., Santa Clara, CA (US)

( * ) Notice: Subject to any disclaimer, the term of this patent is extended or adjusted under 35 U.S.C. 154(b) by 1094 days.

(21) Appl. No.: 12/582,260

(22) Filed: Oct. 20, 2009

(65) Prior Publication Data

US 2011/0093953 A1    Apr. 21, 2011

(51) Int. Cl.
| | |
|---|---|
| *G06F 11/00* | (2006.01) |
| *G06F 12/14* | (2006.01) |
| *G06F 12/16* | (2006.01) |
| *G08B 23/00* | (2006.01) |
| *G06F 21/62* | (2013.01) |
| *G06F 21/56* | (2013.01) |
| *G06F 7/04* | (2006.01) |
| *G06F 17/30* | (2006.01) |
| *H04N 7/16* | (2011.01) |
| *H04L 29/06* | (2006.01) |

(52) U.S. Cl.
CPC ............... *G06F 21/629* (2013.01); *H04L 63/12* (2013.01); *G06F 21/56* (2013.01); *G06F 21/568* (2013.01); *G06F 2221/2115* (2013.01); *G06F 2221/2141* (2013.01); *G06F 2221/2147* (2013.01)

(58) Field of Classification Search
CPC ..... G06F 21/30; G06F 21/3003; G06F 21/50; G06F 21/56; G06F 21/566; G06F 21/568; H04L 63/12

USPC .......................... 726/22, 24, 26; 713/193, 194
See application file for complete search history.

(56) References Cited

U.S. PATENT DOCUMENTS

| | | | |
|---|---|---|---|
| 5,987,610 | A | 11/1999 | Franczek et al. |
| 6,073,142 | A | 6/2000 | Geiger et al. |
| 6,460,050 | B1 | 10/2002 | Pace et al. |
| 7,472,288 | B1 * | 12/2008 | Chou et al. ................... 713/193 |
| 7,472,420 | B1 | 12/2008 | Pavlyushchik |
| 7,506,155 | B1 | 3/2009 | Stewart et al. |
| 7,870,612 | B2 * | 1/2011 | Liu ................................ 726/24 |

(Continued)

FOREIGN PATENT DOCUMENTS

| | | |
|---|---|---|
| KR | 20030090568 A | 11/2003 |
| WO | WO 2011/050089 A2 | 4/2011 |

OTHER PUBLICATIONS

International Search Report and Written Opinion in Application No. PCT/US2010/053414, dated May 30, 2011, 9 pages.

*Primary Examiner* — Ashok Patel
*Assistant Examiner* — Daniel Potratz
(74) *Attorney, Agent, or Firm* — Patent Capital Group

(57) ABSTRACT

Methods, systems, and apparatus, including computer programs encoded on a computer storage medium, for responding to an attempt to disable a malware protection program and performing an identification process and one or more protection processes to prevent the execution of potentially malicious code. In one aspect, a method includes monitoring for attempts to disable a malware protection program, identifying a process that generated an attempt to disable the malware protection program, determining whether the process is an approved process, and in response, performing one or more protection processes on the process so as to prevent the execution of potentially malicious code.

18 Claims, 5 Drawing Sheets

(56) References Cited

U.S. PATENT DOCUMENTS

| | | | |
|---|---|---|---|
| 7,941,850 B1 * | 5/2011 | Satish | 726/22 |
| 8,065,728 B2 * | 11/2011 | Wang et al. | 726/22 |
| 8,732,839 B2 * | 5/2014 | Hohl | 726/25 |
| 2003/0177394 A1 * | 9/2003 | Dozortsev | 713/201 |
| 2006/0075499 A1 | 4/2006 | Edwards et al. | |
| 2009/0038011 A1 | 2/2009 | Nadathur | |
| 2009/0165132 A1 * | 6/2009 | Jain et al. | 726/22 |

* cited by examiner

PREVENTING AND RESPONDING TO DISABLING OF MALWARE PROTECTION SOFTWARE

BACKGROUND

This specification relates to malware protection software, and more particularly to preventing and responding to an attempt to disable malware protection software.

Malware is any kind of malicious software such as, for example, a computer virus, Trojan horse, spyware, and malicious active content. Malware can spread via infected email attachments, shared files, or malicious websites. Malware attach to files so when the infected file executes, the malware also execute and, for example, self-replicate without user knowledge or permission. Other malware target a computer's memory and infect files as the computer opens, modifies, or creates files. Some malware can lie dormant and not show any signs of existence, e.g., key capture software, monitoring software, etc.

Malware protection software generally operates by scanning a computer's memory and disk drives or monitoring network traffic for malicious code. Some malware can disable or otherwise attack or infect the malware protection software itself. If such malware attacks are not detected by the malware protection software, the malware protection software becomes compromised and the malware causes further damage to the system such as infecting system files, downloading and installing other malware, stealing confidential information, etc. Even if the attempt to disable the malware protection software is prevented, the malware protection software may fail to prevent the malware from causing further damage to the system.

SUMMARY

This specification describes technologies relating to preventing and responding to attacks on malware protection software and preventing further damage to the system.

In general, one innovative aspect of the subject matter described in this specification can be embodied in methods that include the actions of monitoring, by a first computer, for attempts to disable a malware protection program; in response to monitoring an attempt to disable the malware protection program: identifying, by the first computer, a first process that generated the attempt to disable the malware protection program; preventing, by the first computer, the first process from disabling the malware protection program; determining, by the first computer, whether the first process is an approved process; in response to determining that the first process is an approved process, providing, by the first computer, a user prompt to terminate the first process; and in response to determining that the first process is not an approved process, performing, by the first computer, one or more protection processes on the first process. Other implementations of this aspect include corresponding systems, apparatus, and computer programs, configured to perform the actions of the methods, encoded on computer-readable storage devices.

Particular implementations of the subject matter described in this specification can be implemented so as to realize one or more of the following advantages. A computer process that attempts to disable the malware protection software is monitored and prevented from disabling the malware protection software. The process is identified and information is collected so that a determination can be made as to what protection processes should be provided. Approved processes attempting to disable the malware protection software will be prevented from doing so and the user will be provided the option to terminate the approved process. Non-approved processes attempting to disable the malware protection software will be prevented from doing so and one or more protection processes will be performed.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
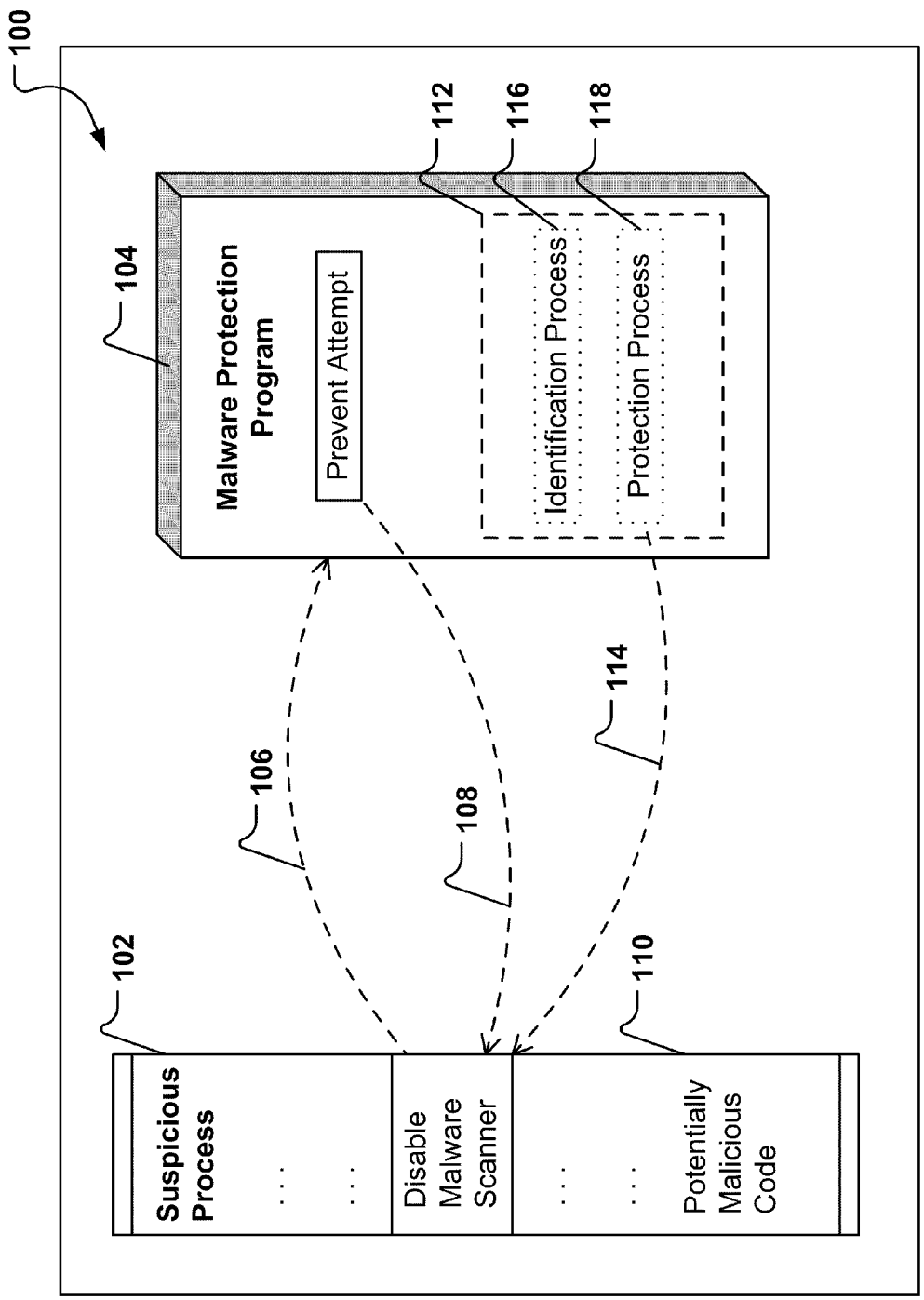
FIG. 1 is a block diagram illustrating an example identification process and one or more protection processes being performed on a suspicious process after blocking its attempt to disable malware protection software.

FIG. 1 is a block diagram illustrating an example identification process and one or more protection processes being performed on a suspicious process after blocking its attempt to disable malware protection software. As used herein, a "malware protection program" is any kind of malware protection software including, for example, a malware scanner, antivirus software, and network traffic monitoring software.

As illustrated in FIG. 1, the process 102 attempts to disable a malware protection program 104 and execute potentially malicious code on a computer device 100, such as a workstation, server, router, or other data processing apparatus. The process 102 is deemed to be a suspicious process as it is attempting to disable 106 the malware protection program 104. A suspicious process can disable a malware protection program by using a variety of techniques. For example, on a Microsoft Windows operating system, the malware protection program 104 may operate as a Windows service that performs malware scanning functions and which is designed not to require user intervention. Likewise, on a Unix operating system the malware protection program 104 may operate as a daemon that runs in the background rather than under direct control of a user, and on a Macintosh operating system, the malware protection program 104 may operate as an extension or daemon that continuously runs in the background without the need for user intervention. In such cases, and others, the suspicious process 102 may attempt to disable 106 the malware protection program 104 by attempting to stop the malware protection program's service, daemon, or extension, e.g., by issuing a kill command.

Alternatively, the suspicious process may attempt to delete or modify registry entries for the malware protection program. On a Microsoft Windows operating system, computer hardware and software configuration settings are stored as keys in a registry. When a user installs new software or computer configuration settings are otherwise altered, the values of these keys change. If viruses, other malware, or other programs modify these keys, they can do damage to the hardware or software to which the key corresponds, or the system generally. Thus, the suspicious process 102 may attempt to disable 106 the malware protection program 104 by deleting or modifying registry entries or keys that control the configuration and operation of the malware protection program 104. The suspicious process 102 may also attempt to disable 106 the malware protection program 104 by, for example, attempting to terminate the respective malware protection program process or processes, delete one or more malware protection program files, or prevent the malware protection program from being updated by a remote computer.

As further illustrated in FIG. 1, the malware protection program 104 prevents 108 the suspicious process 102 from disabling 106 the malware protection program, by, for example, blocking the suspicious process from stopping the malware protection program service, daemon, or extension, or blocking the suspicious process from deleting files required by the malware protection program for proper operation.

Without doing more, however, the malware protection program does not prevent the possible malware from executing its potentially malicious code 110. Malicious code is a piece of code designed to damage a system and the data it contains, or to prevent the system from being used in its normal manner. For example, if the suspicious process 102 is a relatively new instance of malware for which the malware protection program does not have a signature file, the suspicious process 102 may execute malicious code 110 without intervention by the malware protection program 104.

Therefore, the identification and protection module 112 performs an identification process 116 on the suspicious process. The identification and protection module 112 can be embodied in software code and, for example, form part of the malware protection program or run independently as a separate program with its own processes, services, etc. The identification process 116 collects information on the suspicious process 102. This information may include the identity of the suspicious process that generated the attempt to disable the malware protection program.

The identification process 116 determines whether the suspicious process is an approved process based on data descriptive of the suspicious process including, for example, data descriptive of the executable machine code associated with the suspicious process. An approved process can be, for example, a digitally signed process or a pre-approved system process such as that required by the operating system. Depending on the outcome of this determination, the suspicious process may be optionally terminated or other protection processes 118 may be performed on the suspicious process, thereby preventing 114 the execution of the potentially malicious code 110.

Figure 2:
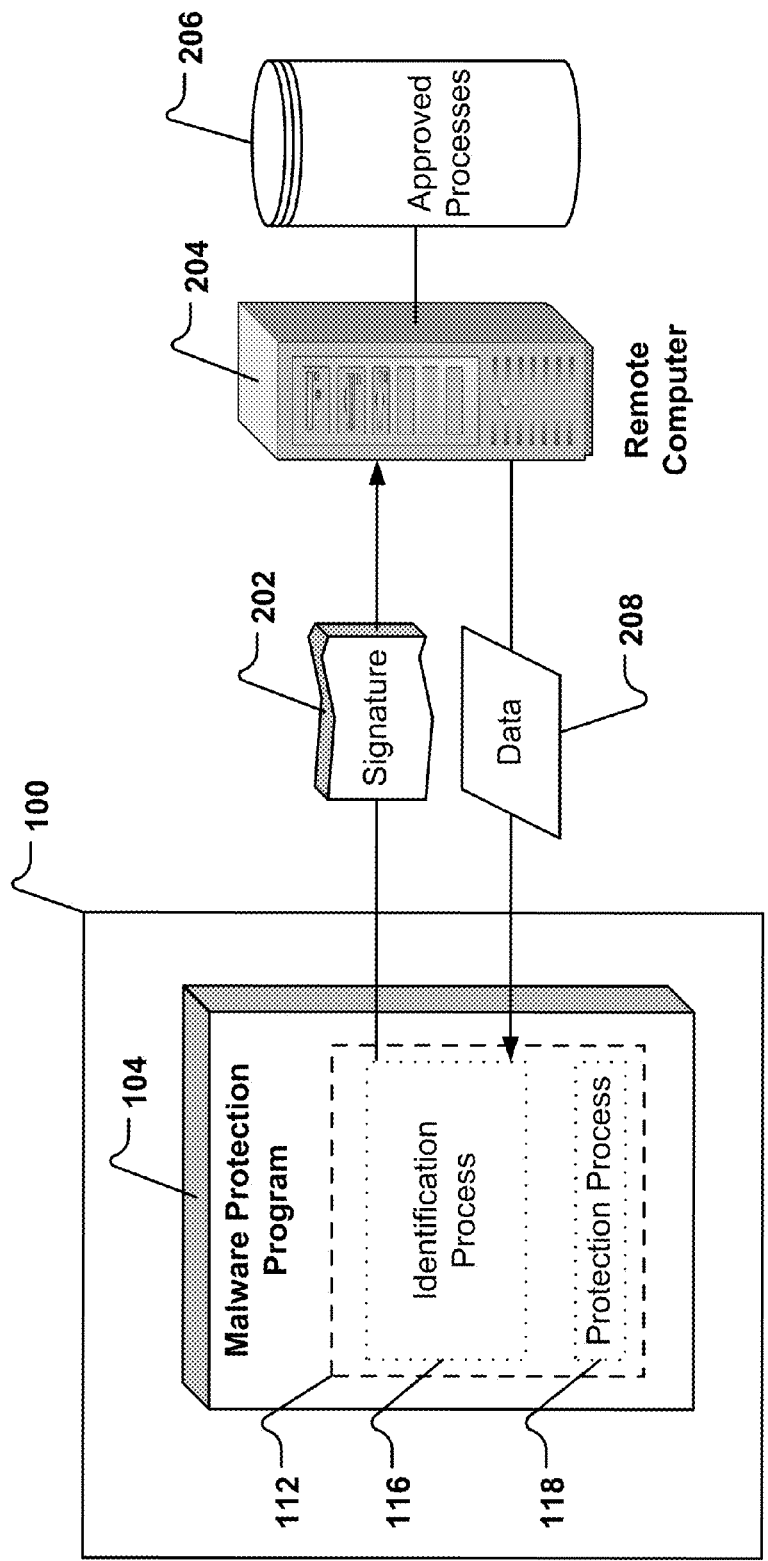
FIG. 2 is a block diagram illustrating an example identification process that determines whether the suspicious process is an approved process.

FIG. 2 is a block diagram illustrating an example identification process that determines whether the suspicious process is an approved process. The example identification process 116 is executed on a computer device 100, such as a personal computer. A suspicious process is identified and data descriptive of the suspicious process that attempted to disable the malware protection program is generated and sent to a remote computer. In this example implementation, the data 202 descriptive of the suspicious process is sent to a remote computer 204 that contains a database or other stored compilation of other data descriptive of approved processes 206. The remote computer 204 may be maintained by the provider of the malware protection program. The remote computer 204 returns data 208 indicative of whether the suspicious process is an approved process, and a determination is made in the identification process 116, based on the data 208 received by the remote computer 204, as to whether the suspicious process is an approved process.

A signature 202 is one example of data descriptive of the suspicious process in accordance with one example implementation of the present invention. A signature is a data pattern—often a simple string of characters or bytes—that can be used to identify a particular file, process, or other electronic data. Examples of signatures include hashes of a file or hashes of portions of the file. Malware protection programs can use signatures, for example, to detect and locate specific malware such as viruses, or otherwise identify services, processes, or files.

As illustrated in FIG. 2, the signature 202 descriptive of the suspicious process is generated by the identification process 116 and sent to the remote computer 204. The remote computer 204 compares the received signature 202 to data descriptive of approved processes contained in the database or other stored compilation 206 and returns data 208 indicative of whether the suspicious process is an approved process. Data descriptive of approved processes contained in the database or other stored compilation may include signatures of approved files. Based on the received data 208, a determination is made in the identification process 116 as to whether the suspicious process is an approved process. The suspicious process can also be flagged as malware based on the received data 208, where, for example, the malware protection program has not received the latest update.

In other implementations, the database or other stored compilation of data descriptive of approved processes 206 can be stored locally on the computer device 100 on which the suspicious process and malware protection program are running. That is, the signature 202 can be generated and compared to a locally stored database or other locally stored compilation of data descriptive of approved processes and known malware.

The signature 202 is one example of data descriptive of the suspicious process. Other data can be generated and used to make the determination of whether the suspicious process is an approved process, including even a complete data copy of the one or more files associated with the suspicious process, e.g., the executable machine code associated with the suspicious process.

Figure 3:
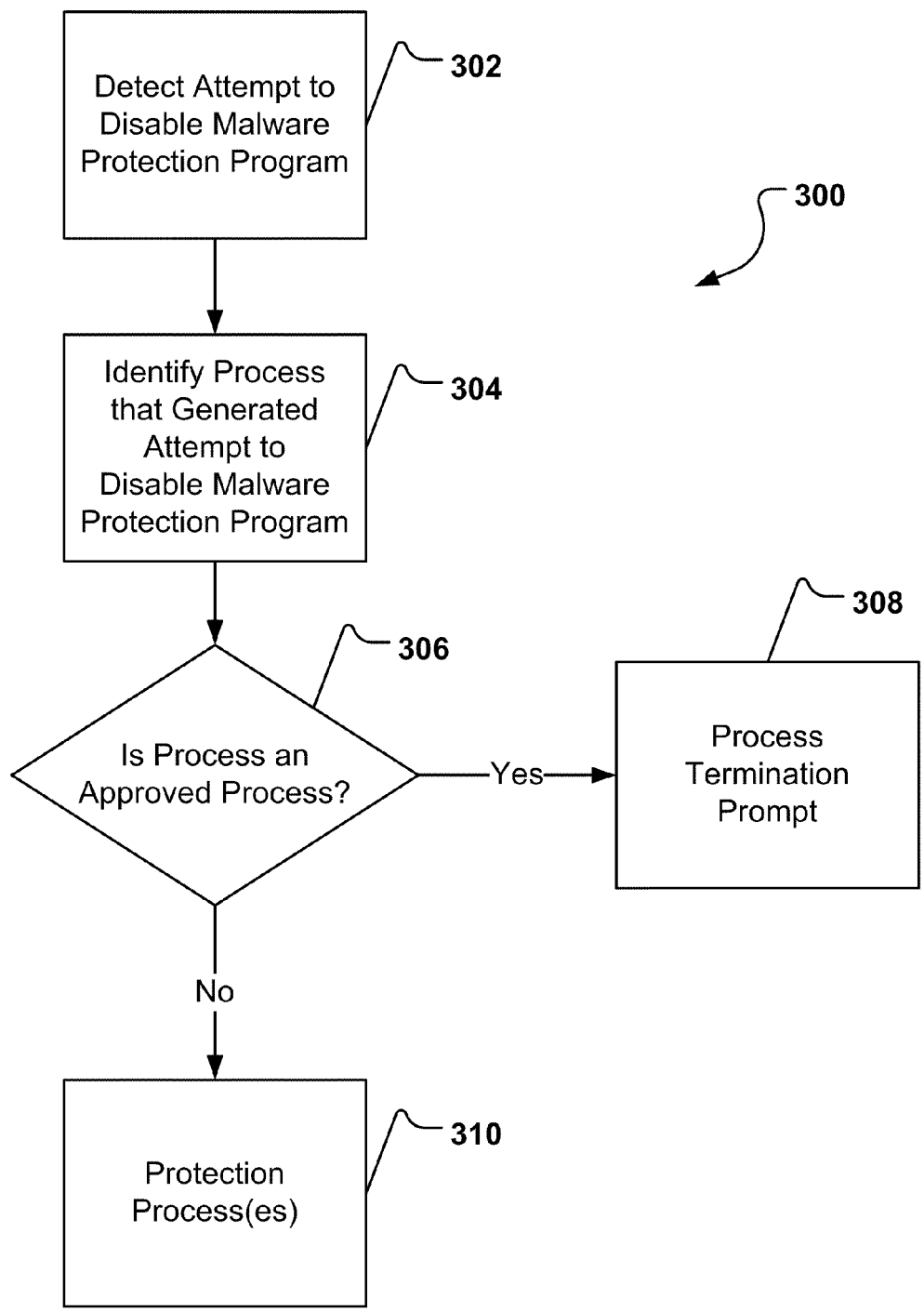
FIG. 3 is a flow diagram illustrating an example process for responding to attempts to disable malware protection software.

FIG. 3 is a block diagram of an example process 300 for responding to attempts to disable a malware protection program. The example process 300 can be implemented in a malware protection program 104, e.g., antivirus software, or embodied in software code that runs independently as a separate program with its own processes, services, etc.

The process 300 detects an attempt to disable a malware protection program (302). Such an attempt can be detected, for example, by monitoring any attempt to stop the malware protection program service, daemon, or extension, terminate the malware protection program process or processes, delete one or more files associated with the malware protection program, delete or modify registry entries for the malware protection program, or prevent the malware protection program from being updated.

The process 300 may monitor for attempts to disable the malware protection program (302) by installing "hooks" in the computer operating system. For example, in the Microsoft Windows operating system, the process 300 may install hooks that intercept Windows API (application programming interface) calls to delete files, modify registry entries, terminate processes, and disable services. When a process attempts to disable the malware protection program by tampering with the malware protection program files, for instance, the process 300 would detect the attempt (302) by intercepting the Windows API "DeleteFile" call targeting a malware protection program file. Similarly, the process 300 may detect an attempt to disable the malware protection program by intercepting a Windows API "TerminateProcess" call targeting the malware protection program process, or a Windows API "RegRemoveKey" call targeting a registry entry for the malware protection program.

The process 300 identifies the process that generated the attempt to disable the malware protection program (304). The process 300 may identify the process that generated the attempt to disable the malware protection program by, as in the example above, intercepting a Windows API call and collecting information on the process that generated the Windows API call. For example, the process 300 may collect information on the process that generated the Windows API call such as that process's ID, name, and file path.

The process 300 determines whether the process is an approved process (306). The process may be identified as an approved process, for example, based on whether the process's executable machine code is approved. Executable machine code can be approved if, for example, the executable machine code is digitally signed by an approved vendor.

Figure 4:
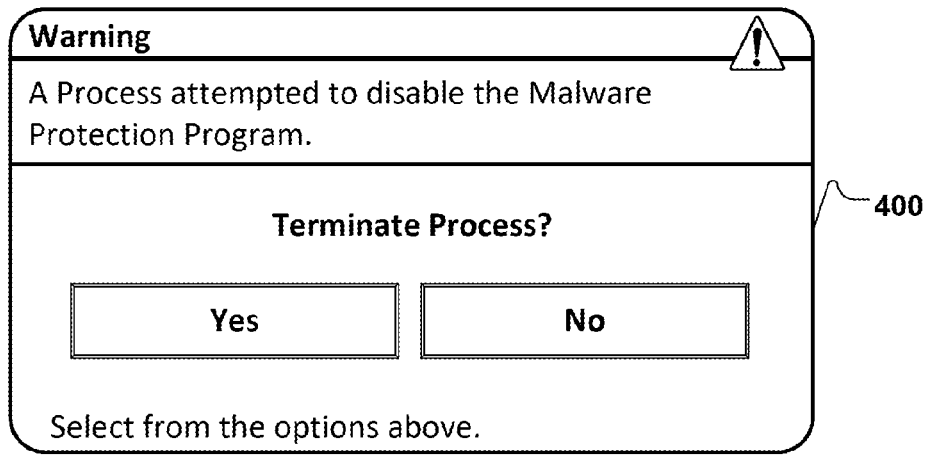
FIG. 4 is an illustration of an example prompt from which a user can specify whether or not an approved process should be terminated.

In response to determining that the process is an approved process, the process 300 provides a process termination prompt (308), as further illustrated in FIG. 4. Even if a process is an approved process, there may be reasons to terminate the approved process. For example, an installation program for a reputable program may attempt to disable a malware protection program, and a user may decide to not install the software, as the user may not want to have the computer device operated in an unprotected state. By way of another example, it may be possible that malware has modified a process created from approved executable machine code by, for example, injecting malicious code into the process. To accommodate for these types of situations, the process 300 provides a termination prompt (308) by which a user can terminate the approved process.

Alternatively, if the process 300 determines that the process is not an approved process, one or more protection processes are performed on the process (310). Protection processes can include, for example, terminating the process or deleting or renaming one or more files associated with the process, such as the process's executable machine code, as further illustrated, by way of example, in FIG. 5.

FIG. 4 is an illustration of an example prompt from which a user can specify whether to terminate a process that attempted to disable a malware protection program. The prompt 400 is provided where the process that attempted to disable the malware protection program is determined to be an approved process.

Figure 5:
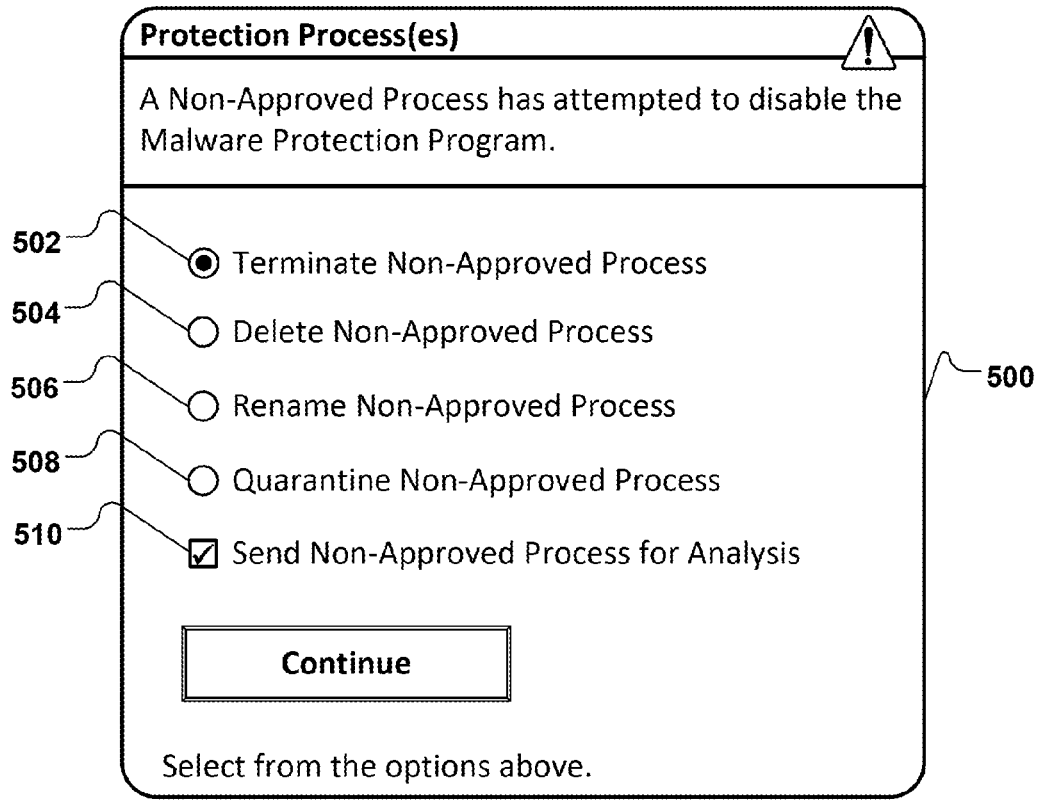
FIG. 5 is an illustration of an example prompt from which a user can specify one of several protection processes that can be performed on a suspicious process.

FIG. 5 is an illustration of an example prompt from which a user can specify one of several protection processes that can be performed on a suspicious process. The prompt 500 is provided after a suspicious process is determined to be a non-approved process. Protection processes can include, for example, terminating the suspicious process 502, deleting files associated with the suspicious process 504, renaming files associated with the suspicious process 506, quarantining files associated with the suspicious process 508, and sending files associated with the suspicious process for further analysis 510, by, for example, a remote computer.

Terminating 502 the suspicious process may involve terminating the suspicious process only or terminating the suspicious process and all other processes directly and/or indirectly initiated by the suspicious process.

Deleting files 504 may involve deleting one or more files associated with the suspicious process. Renaming files 506 may involve assigning a new name or extension to one or more files associated with the suspicious process. Malware protection programs such as antivirus software may rename infected files, virus files, or other files associated with suspicious processes so that they become unusable until they are manually cleaned, deleted, or otherwise handled.

Quarantining files 508 may involve safely isolating and neutralizing one or more files associated with the suspicious process until future action can be taken. There are several situations when it is appropriate to quarantine a file. One situation, for example, is where the suspicious process is identified as a non-approved process but it cannot be determined whether the suspicious process and the one or more files associated with it are malware, or the one or more files associated with the suspicious process cannot be deleted. One example of quarantining 508 can involve encrypting the one or more files associated with the suspicious process, renaming the one or more files, and moving the one or more files to a quarantine directory or folder. In conjunction, for example, with renaming 506 or quarantining 508, the one or more files associated with the suspicious process can be further sent to a remote computer for analysis 510 as illustrated, by way of example, in FIG. 6.

Figure 6:
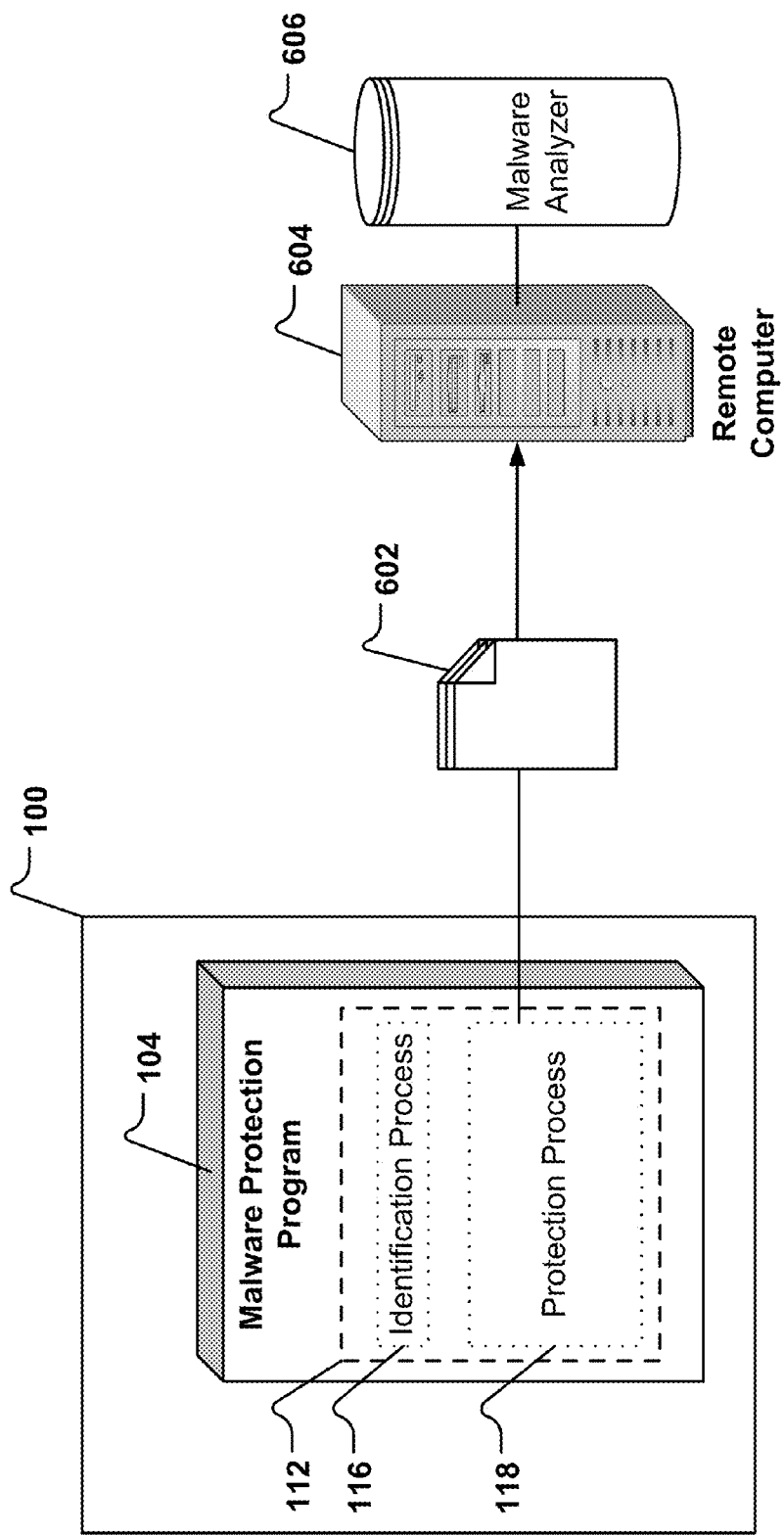
FIG. 6 is a block diagram illustrating an example of a protection process in which one or more files associated with the suspicious process are sent to a remote computer for analysis.

FIG. 6 is a block diagram illustrating an example of a protection process in which one or more files associated with the suspicious process are sent to a remote computer for analysis. The one or more files associated with the suspicious process 602 are sent to a remote computer 604 that contains hardware and software operable to analyze 606 the one or more files associated with the suspicious process 602. At the remote computer 604, the one or more files associated with the suspicious process can be analyzed to determine whether they represent new malware, such as a new virus or previously undetected malware. Updated virus definitions may be created and propagated to computers for use by malware protection programs in detecting the new or previously undetected virus (not shown in FIG. 6).

Implementations of the subject matter and the operations described in this specification can be implemented in digital electronic circuitry, or in computer software, firmware, or hardware, including the structures disclosed in this specification and their structural equivalents, or in combinations of one or more of them. Implementations of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) embodying the processes and logic flows described in this specification can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output.

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, such as user prompt 19 illustrated in FIG. 6, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Implementations of the subject matter described in this specification can be implemented in a computing system that includes clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method, comprising:
   installing a particular code hook on a computing system, wherein the computing system comprises an operating system providing an execution environment and the computing system further comprises one or more programs to execute in the execution environment, the one or more programs include a malware protection program, and the particular code hook is installed using the malware protection program and is configured to intercept application programming interface (API) calls to the operating system;
   detecting that a particular one of the calls, intercepted by the particular code hook, comprises an attempt to disable the malware protection program;
   identifying, using a first computer, a first process that generated the attempt to disable the malware protection program, wherein identifying the first process includes collecting identification data describing characteristics of the first process;
   preventing the first process from disabling the malware protection program, wherein the preventing includes blocking the attempt to disable the malware protection program; and
   determining, in response to blocking the attempt to disable the malware protection program, whether the first process is an approved process based at least in part on the collected identification data;
   wherein determining that the first process is an approved process causes a user prompt to be presented to provide a user an option to terminate the first process and determining that the first process is not an approved process causes one or more malware protection processes to be performed on the first process.

2. The computer-implemented method of claim 1, wherein monitoring for attempts to disable the malware protection program comprises monitoring for one or more of the following:
   an attempt to stop a service of the malware protection program;
   an attempt to terminate a process of the malware protection program;
   an attempt to delete one or more files for the malware protection program;
   an attempt to delete one or more registry entries for the malware protection program; and
   an attempt to prevent an update for the malware protection program.

3. The computer-implemented method of claim 1, wherein determining whether the first process is an approved process comprises:
   generating data descriptive of the first process based at least in part on the identification data;
   sending the data descriptive of the first process to a second computer;
   receiving data indicative of whether the first process is an approved process from the second computer; and
   determining whether the first process is an approved process based at least in part on the data received from the second computer.

4. The computer-implemented method of claim 3, wherein data descriptive of the first process comprises a signature of the first process.

5. The computer-implemented method of claim 1, wherein determining whether the first process is an approved process comprises:
   generating data descriptive of the first process based at least in part on the identification data;
   comparing the data descriptive of the first process with data descriptive of approved processes;
   determining whether the first process is an approved process.

6. The computer-implemented method of claim 5, wherein data descriptive of the first process comprises a signature of the first process.

7. The computer-implemented method of claim 1, wherein the one or more malware protection processes comprise one or more of the following:
   terminating the first process;
   deleting one or more files associated with the first process;
   renaming one or more files associated with the first process;
   quarantining one or more files associated with the first process; and
   sending one or more files associated with the first process to a second computer for analysis.

8. The computer-implemented method of claim 7, wherein performing one or more malware protection processes on the first process further comprises:
   providing a user prompt to perform the one or more malware protection processes;
   receiving one or more selections of the one or more malware protection processes; and
   performing the one or more selected malware protection processes.

9. The computer-implemented method of claim 1, wherein the steps of monitoring, identifying, preventing, determining, providing, and performing are performed by the malware protection program.

10. A non-transitory computer storage medium encoded with a computer program, the program comprising instructions that when executed by a data processing apparatus cause the data processing apparatus to:
   install a particular code hook on a computing system, wherein the computing system comprises an operating system providing an execution environment and the computing system further comprises one or more programs to execute in the execution environment, the one or more programs include a malware protection program, and the particular code hook is installed using the malware protection program and is configured to intercept application programming interface (API) calls to the operating system;
   detect that a particular one of the calls, intercepted by the particular code hook, comprises an attempt to disable the malware protection program;
   identify, using a first computer, a first process that generated the attempt to disable the malware protection program, wherein identifying the first process includes collecting identification data describing characteristics of the first process;

prevent the first process from disabling the malware protection program, wherein the preventing includes blocking the attempt to disable the malware protection program; and determine, in response to blocking the attempt to disable the malware protection program, whether the first process is an approved process based at least in part on the collected identification data;

wherein determining that the first process is an approved process causes a user prompt to be presented to provide a user an option to terminate the first process and determining that the first process is not an approved process causes one or more malware protection processes to be performed on the first process.

11. The computer storage medium of claim 10, comprising further instructions that, when executed, cause the data processing apparatus to monitor for one or more of the following:

an attempt to stop a service of the malware protection program;

an attempt to terminate a process of the malware protection program;

an attempt to delete one or more files for the malware protection program;

an attempt to delete one or more registry entries for the malware protection program; and an attempt to prevent an update for the malware protection program.

12. The computer storage medium of claim 10, comprising further instructions that, when executed, cause the data processing apparatus to:

generate data descriptive of the first process based at least in part on the identification data;

send the data descriptive of the first process to a second computer;

receive data indicative of whether the first process is an approved process from the second computer; and determine whether the first process is an approved process based at least in part on the data received from the second computer.

13. The computer storage medium of claim 12, wherein data descriptive of the first process comprises a signature of the first process.

14. The computer storage medium of claim 13, wherein data descriptive of the first process comprises a signature of the first process.

15. The computer storage medium of claim 10, comprising further instructions that, when executed, cause the data processing apparatus to:

generate data descriptive of the first process based at least in part on the identification data;

compare the data descriptive of the first process with data descriptive of approved processes; and determine whether the first process is an approved process.

16. The computer storage medium of claim 10, wherein the one or more malware protection processes comprise one or more of the following:

terminating the first process;

deleting one or more files associated with the first process;

renaming one or more files associated with the first process;

quarantining one or more files associated with the first process; and sending one or more files associated with the first process to a second computer for analysis.

17. The computer storage medium of claim 16, comprising further instructions that, when executed, cause the data processing apparatus to:

provide a user prompt to perform the one or more malware protection processes;

receive one or more selections of the one or more malware protection processes; and perform the one or more selected malware protection processes.

18. A system comprising:

at least one data processing device;

at least one memory element;

an operating system to provide an execution environment; and a plurality of programs to execute within the execution environment, wherein the plurality of programs comprise a malware protection program to:

install software hooks within the system, wherein the hooks are each configured to intercept application programming interface (API) calls to the operating system;

detect malware affecting other programs in the plurality of programs;

determine that a particular API call intercepted by one of the hooks comprises an attempt to disable the malware protection program;

identify a particular process that generated the particular intercepted call, wherein identifying the particular process includes collecting identification data describing characteristics of the particular process;

prevent the particular process from disabling the malware protection program by at least blocking the attempt to disable the malware protection program; and determine, in response to blocking the attempt to disable the malware protection program, whether the particular process is an approved process based at least in part on the collected identification data, wherein determining that the particular process is an approved process causes a user prompt to be presented to provide a user an option to terminate the particular process and determining that the first process is not an approved process causes one or more malware protection processes to be performed on the particular process.

* * * * *